United States Patent [19]

Parker

[11] Patent Number: 5,697,743
[45] Date of Patent: Dec. 16, 1997

[54] TAMPER PROOF THREADED FASTENER

[76] Inventor: Stanley F. Parker, 6618 Bloomfield La., West Bloomfield, Mich. 48322

[21] Appl. No.: 725,888

[22] Filed: Oct. 4, 1996

[51] Int. Cl.⁶ ............................. F16B 23/00; F16B 31/00
[52] U.S. Cl. ...................... 411/5; 411/406; 411/407; 411/919
[58] Field of Search .................. 411/2, 3, 5, 406, 411/407, 410, 919; 81/125

[56] References Cited

U.S. PATENT DOCUMENTS

| | | | |
|---|---|---|---|
| 1,677,269 | 7/1928 | Burghart | 411/5 |
| 3,343,443 | 9/1967 | Moore | 411/5 |
| 3,812,757 | 5/1974 | Reiland | 411/5 |
| 4,109,691 | 8/1978 | Wilson | 411/3 X |
| 4,171,662 | 10/1979 | Simone et al. | |
| 4,225,165 | 9/1980 | Kesselman | 411/5 X |
| 4,504,180 | 3/1985 | Ishii et al. | 411/5 |
| 4,800,787 | 1/1989 | Cerny | 81/121.1 |
| 4,809,569 | 3/1989 | Erb | 81/121.1 |
| 4,948,312 | 8/1990 | Jochum | 411/5 |
| 5,269,208 | 12/1993 | Kolvites et al. | 81/176.2 |

*Primary Examiner*—Neill R. Wilson
*Attorney, Agent, or Firm*—Henderson & Sturm

[57] ABSTRACT

A tamper proof threaded fastener construction (10) comprising a conventional elongated threaded fastener body member (20) having an enlarged head member (30) provided with a contoured and tapered frangible member (40) which is used to drive the fastener construction (10) in a rotatable fashion, and when the frangible member (40) is removed leaves an irregular surface (45) which prevents the fastener construction (10) from being rotatably driven in any direction.

10 Claims, 2 Drawing Sheets

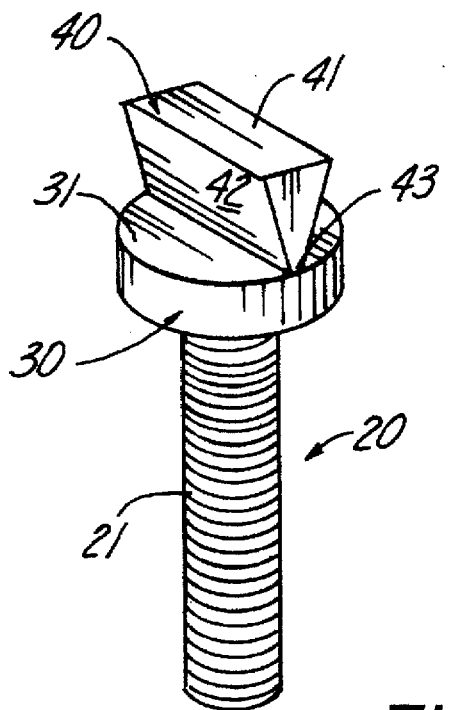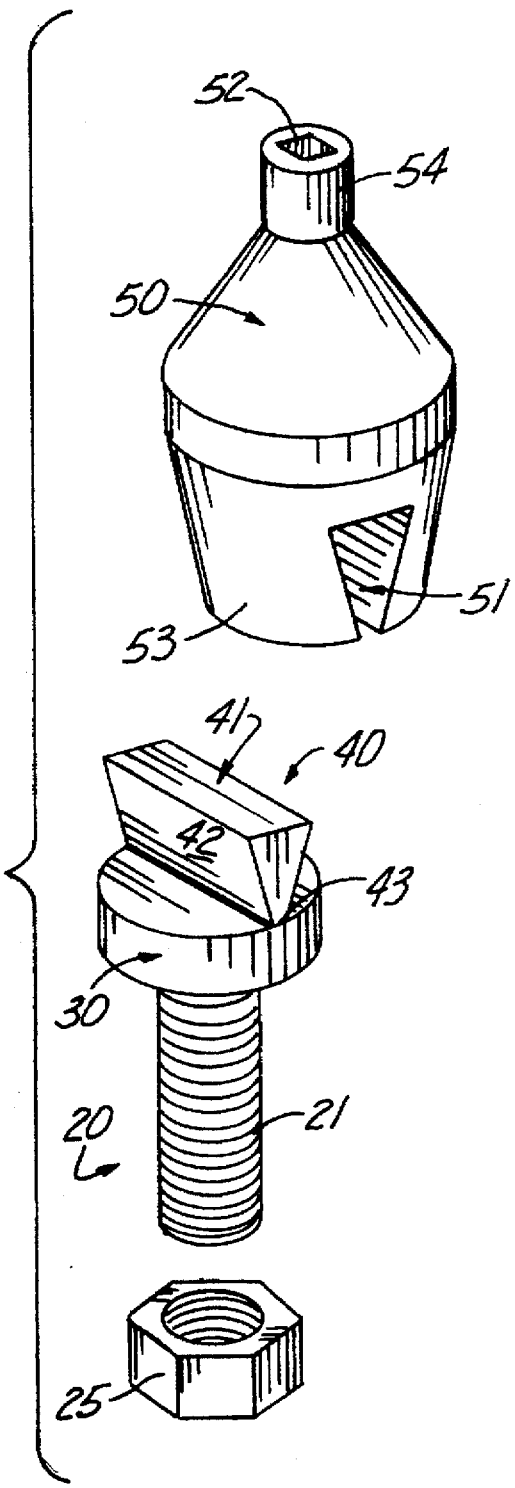

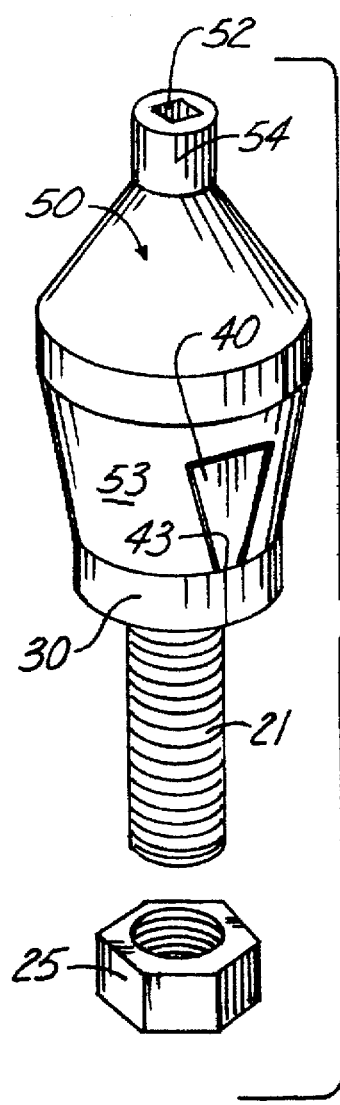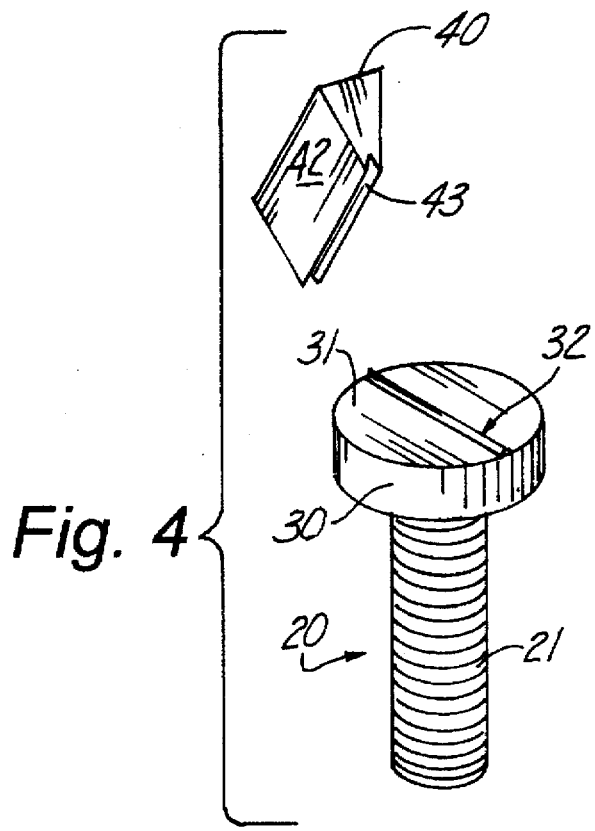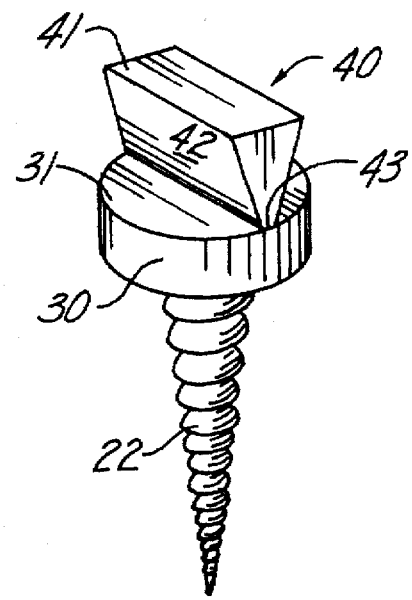
Fig. 3
Fig. 4
Fig. 5

TAMPER PROOF THREADED FASTENER

TECHNICAL FIELD

The present invention relates to the field of tamper proof screw designs in general, and in particular to a new type of tamper proof threaded fastener construction having a frangible drive portion.

BACKGROUND ART

As can be seen by reference to the following U.S. Pat. Nos. 4,800,787; 4,809,569; 4,171,662; and 5,269,208, the prior art is replete with myriad and diverse tamper proof fastening devices and driving tools to install the same.

While all of the aforementioned prior art constructions are more than adequate for the basic purpose and function for which they have been specifically designed, they are also all uniformly deficient with regard to the fact that while they all employ uniquely shaped fastener heads and complementary configured special tools for installing the fasteners, anyone possessing the specially configured tool can effect the removal of the supposedly tamper proof fasteners.

As a consequence of the foregoing situation, there has existed a longstanding need for a new type of truly tamper proof fastener that once it is installed by a specially designed tool, the fastener construction may be forcibly deformed to render the specially configured tool inoperative with regard to the removal of the fastener construction, and the provision of such a construction is a stated objective of the present invention.

DISCLOSURE OF THE INVENTION

Briefly stated, the tamper proof fastener construction that forms the basis of the present invention comprises in general a conventional threaded fastener body member provided with an enlarged head member having a contoured tapered frangible member formed thereon.

As will be explained in greater detail further on in the specification, a special driving tool is used in conjunction with the fastener construction wherein the driving tool is provided with a contoured recess dimensioned to receive the contoured frangible member. The driving tool may be rotatably employed to install the tamper proof fastener in a conventional manner.

However, once the tamper proof fastener has been installed at the desired location, the frangible member may be forcibly detached from the enlarged head member of the fastener construction leaving an irregular surface remaining on the enlarged head member that cannot be engaged by any known tool.

In addition, the aforementioned forcible detachment may take place either while the frangible member is operatively engaged in the driving tool or removed therefrom.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is an isolated perspective view of the tamper proof threaded bolt version of this invention;

FIG. 2 is an exploded perspective view of the threaded bolt version prior to being engaged by the special driving tool;

FIG. 3 is an exploded perspective view of the threaded bolt version engaged by the special driving tool;

FIG. 4 is an isolated perspective view of the threaded bolt version with the frangible member removed; and FIG. 5 is an isolated perspective view of the tamper proof threaded screw version of this invention.

BEST MODE FOR CARRYING OUT THE INVENTION

As can be seen by reference to the drawings, and in particularly to FIG. 1, the tamper proof threaded fastener construction that forms the basis of the present invention is designated generally by the reference number (10). The threaded fastener construction (10) comprises in general an elongated conventional threaded body member (20) having an enlarged head member (30) provided with a frangible member (40).

In the preferred embodiment of the invention illustrated in FIGS. 1 and 5, the elongated conventional threaded body member (20) will comprise either an elongated generally cylindrical threaded bolt (21) or an elongated generally tapered threaded screw (22). In both versions the enlarged head member (30) is provided with a generally short flat cylindrical configuration.

Still referring to FIGS. 1 and 5, it can be seen that the frangible member (40) has a generally dovetail cross-sectional configuration including an enlarged head portion (41) having inwardly angled sides (42) which terminate in a narrow neck portion (43) which is fixedly secured to the top (31) of the enlarged head member (30).

Turning now to FIGS. 2 and 3, it can be seen that a special driving tool (50) is envisioned for use with the tamper proof threaded fastener construction (10) that forms the basis of the present invention. The driving tool (50) is provided with an enlarged contoured lateral recess (51) in its lower end (53) and dimensioned to closely conform to, and slidably receive the contoured frangible member (40).

In addition, the driving tool (50) is further provided with a central recess (52) disposed in its upper end (54) which is dimensioned to be operatively engaged by a power tool (not shown) for rotatably driving the new threaded fastener construction (10) in a well recognized fashion either into engagement with a threaded nut (25) illustrated in FIGS. 2 and 3 or into a workpiece (not shown) as would be the case with the threaded screw version illustrated in FIG. 5.

As can best be seen by reference to FIG. 5, once the threaded body member (20) is installed at a desired location the fastener construction (10) may be made "tamper proof" by forcibly separating the frangible member (40) from the top (31) of the enlarged head member (30) by applying force against one of the sides (42) of the frangible member (40) to snap the narrow neck (43) of the frangible member (40) at its juncture with the enlarged head member (30) such that an irregularly surfaced stub (32) remains attached to the top (31) of the head member (30).

Given the short irregular configuration of the stub (32), no known tool could then be employed to impart rotary motion to the generally cylindrical periphery of the head member (31) to disengage the deformed threaded fastener construction (10) from its operative disposition.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A tamper proof threaded fastener construction comprising:

a conventional elongated threaded fastener body member;

an enlarged head member disposed on one end of the elongated threaded body member; and frangible means formed on said enlarged head member for rotatably driving said threaded fastener construction in one direction wherein the removal of the frangible means prevents the enlarged head member from being rotatably driven in any direction wherein said frangible means has a generally dovetail cross-sectional configuration.

2. The fastener construction as in claim 1 wherein said frangible means projects upwardly from the enlarged head member.

3. The fastener construction as in claim 2 wherein said frangible means comprises:

an enlarged tapered wedge member whose narrowest end is operatively secured to the top of said enlarged head member.

4. The fastener construction as in claim 1 wherein the conventional elongated threaded fastener body member has an elongated generally cylindrical configuration.

5. The fastener construction as in claim 1 wherein the conventional elongated threaded fastener body member has an elongated generally tapered configuration.

6. The fastener construction as in claim 1 wherein the removal of said frangible means from said enlarged head member produces a non-uniform surface on said enlarged head member.

7. A tamper proof threaded fastener construction comprising:

a conventional elongated threaded fastener body member;

an enlarged head member disposed on one end of the elongated threaded body member; and frangible means formed on said enlarged head member for rotatably driving said threaded fastener construction in one direction wherein the removal of the frangible means prevents the enlarged head member from being rotatably driven in any direction, said frangible means projects upwardly from the enlarged head member and comprises an enlarged tapered wedge member whose narrowest end is operatively secured to the top of said enlarged head member.

8. The fastener construction as in claim 7 wherein the conventional elongated threaded fastener body member has an elongated generally cylindrical configuration.

9. The fastener construction as in claim 7 wherein the conventional elongated threaded fastener body member has an elongated generally tapered configuration.

10. The fastener construction as in claim 7 wherein the removal of said frangible means form said enlarged head member produces a non-uniform surface on said enlarged head member.

* * * * *